(12) United States Patent
Andersen et al.

(10) Patent No.: US 10,443,958 B2
(45) Date of Patent: Oct. 15, 2019

(54) POWDERED METAL AS A SACRIFICIAL MATERIAL FOR ULTRASONIC ADDITIVE MANUFACTURING

(71) Applicant: Raytheon Company, Waltham, MA (US)

(72) Inventors: Michael L. Andersen, Denver, CO (US); Travis L. Mayberry, Dallas, TX (US); Gregory P. Schaefer, McKinney, TX (US)

(73) Assignee: Raytheon Company, Waltham, MA (US)

( * ) Notice: Subject to any disclaimer, the term of this patent is extended or adjusted under 35 U.S.C. 154(b) by 645 days.

(21) Appl. No.: 15/137,370

(22) Filed: Apr. 25, 2016

(65) Prior Publication Data

US 2017/0304964 A1    Oct. 26, 2017

(51) Int. Cl.
*B23K 1/06* (2006.01)
*F28F 9/02* (2006.01)
(Continued)

(52) U.S. Cl.
CPC ............... *F28F 9/02* (2013.01); *B23K 20/10* (2013.01); *B23K 20/103* (2013.01); *B23K 20/22* (2013.01); *B23K 20/2336* (2013.01); *F28F 7/02* (2013.01); *B23K 2101/14* (2018.08); *B23K 2103/08* (2018.08); *B23K 2103/10* (2018.08); *B33Y 10/00* (2014.12); *B33Y 80/00* (2014.12); *F28F 2250/106* (2013.01)

(58) Field of Classification Search
CPC .......... F28F 9/02; F28F 7/02; F28F 2250/106; B23K 20/22; B23K 20/2336; B23K 20/10–106; B23K 20/103; B23K 2103/08; B23K 2101/14; B23K 2103/10; B33Y 80/00; B33Y 10/00
USPC ................................................ 228/110.1, 1.1
See application file for complete search history.

(56) References Cited

U.S. PATENT DOCUMENTS 2,331,689 A * 10/1943 Hodge ................... B23K 9/035
                                                           219/160
3,844,011 A * 10/1974 Davies .................. B22F 3/1109
                                                              419/9
(Continued)

FOREIGN PATENT DOCUMENTS

GB    1493139 A  * 11/1977 ............. B01D 53/86
JP    06213703 A  *  8/1994
JP    2018051578 A *  4/2018

*Primary Examiner* — Kiley S Stoner
(74) *Attorney, Agent, or Firm* — Renner, Otto, Boisselle & Sklar, LLP

(57) ABSTRACT

A manifold structure and method of forming a structure having at least one enclosed cavity includes using an ultrasonic additive manufacturing (UAM) process to build up a solid component, forming a cavity in the solid component, filling the cavity with a sacrificial material, using a UAM process to build up a finstock layer over the cavity filled with the powder material to enclose the cavity and form the enclosed cavity, and removing the sacrificial material from the enclosed cavity after the finstock layer is ultrasonically welded to the solid component. The sacrificial material has an adequate density to support the UAM process of forming the finstock layer over the cavity and the material may be removed from the enclosed cavity, resulting in an enclosed cavity having smooth surfaces with an optimal fluid flow area therethrough.

13 Claims, 3 Drawing Sheets

(51) Int. Cl.
   *B23K 20/10*   (2006.01)
   *B23K 20/22*   (2006.01)
   *B23K 20/233*  (2006.01)
   *F28F 7/02*    (2006.01)
   *B33Y 10/00*       (2015.01)
   *B33Y 80/00*       (2015.01)
   *B23K 101/14*      (2006.01)
   *B23K 103/10*      (2006.01)
   *B23K 103/08*      (2006.01)

(56) References Cited

U.S. PATENT DOCUMENTS

| | | | | |
|---|---|---|---|---|
| 4,354,303 A | * | 10/1982 | Staley | B23P 6/00 188/18 A |
| 5,737,840 A | * | 4/1998 | Akachi | F28D 15/0233 29/890.03 |
| 6,519,500 B1 | * | 2/2003 | White | G05B 19/00 156/73.1 |
| 6,527,372 B1 | * | 3/2003 | Choi | B41J 2/14 347/54 |
| 9,815,152 B2 | * | 11/2017 | Foucher | B23P 6/04 |
| 2011/0171055 A1 | * | 7/2011 | Yang | B22F 3/004 419/9 |
| 2014/0312098 A1 | * | 10/2014 | Hofmann | B23K 20/103 228/111 |
| 2014/0360698 A1 | * | 12/2014 | Waldman | B22F 3/1055 165/81 |
| 2015/0094837 A1 | * | 4/2015 | Cohen | B33Y 10/00 700/98 |
| 2015/0137412 A1 | * | 5/2015 | Schalansky | B22F 3/1055 264/129 |
| 2015/0290711 A1 | * | 10/2015 | Norfolk | B23K 20/103 425/78 |
| 2015/0352661 A1 | * | 12/2015 | Karlen | B23K 20/10 428/586 |
| 2016/0332229 A1 | * | 11/2016 | Snyder | F01D 25/12 |
| 2017/0106469 A1 | * | 4/2017 | Karlen | B23K 20/10 |
| 2017/0216959 A1 | * | 8/2017 | Bruck | B23K 20/06 |
| 2017/0286821 A1 | * | 10/2017 | Nardi | B33Y 80/00 |
| 2017/0356698 A1 | * | 12/2017 | Andersen | B23P 15/26 |
| 2017/0361540 A1 | * | 12/2017 | Li | B23K 20/22 |
| 2018/0297144 A1 | * | 10/2018 | Mayberry | B23K 20/10 |
| 2018/0361501 A1 | * | 12/2018 | Hardwick | B23K 20/1245 |
| 2019/0047031 A1 | * | 2/2019 | Hahnlen | B21D 22/02 |

\* cited by examiner

POWDERED METAL AS A SACRIFICIAL MATERIAL FOR ULTRASONIC ADDITIVE MANUFACTURING

FIELD OF THE INVENTION

The invention relates to structures manufactured using ultrasonic additive manufacturing, and more particularly, forming structures with free spaces using ultrasonic additive manufacturing.

DESCRIPTION OF THE RELATED ART

Ultrasonic additive manufacturing (UAM) is an additive manufacturing technique in which metal foils are welded to one another to form a solid component. The solid component may be a free-standing structure or an added part to an existing solid structure. The UAM process is a solid-state metal deposition process that enables the build-up of metal components to form the component. During the UAM process, high-frequency ultrasonic vibrations are applied to metal foil materials to break oxide layers on metal tapes and create a solid-state weld. Relatively large forces are applied to the metal tapes to hold the tapes together and form a metallurgical bond between the tapes.

UAM is generally used to form structures having complex internal features. UAM may be advantageous in forming a structure having internal cavities, such as a structure that provides heating or cooling for a surface to which the structure is affixed. In such an application the structure may be a manifold or any other suitable structure that contains at least one flow passage allowing fluid flow through the structure. Applying the metal tapes over the cavities to build up the structure may result in the tape layers bowing or deforming into the empty space of the cavity and effectively changing the geometry of the empty space. The change in geometry may have adverse effects on fluid flow through the passage.

SUMMARY OF THE INVENTION

Ultrasonic additive manufacturing (UAM) is advantageous in forming a structure having an enclosed cavity. An example of such a structure is a manifold structure having flow passages therethrough that may be used in applications such as in cooling electronics. A finned manifold structure, such as a heat exchanger, is advantageous in that the finstock provides for more efficient heat transfer, by way of convection across the finstock. Using UAM to build up layers of finstock in a flow passage of the heat exchanger allows layers of finstock to be horizontally stacked in a direction normal to the direction of heat flow through the flow passage. The arrangement of the finstock provides more efficient heat transfer as compared with conventional heat exchangers that have vertically-arranged finstock.

A metal component of the manifold structure may be built up by a UAM process and a cavity may be formed therein to provide a flow passage through the manifold structure. Finstock layers are built up by the UAM process and additional cavities may be provided between each of the layers to provide additional flow passages through the manifold structure. A sacrificial material may be arranged and compacted within the cavity to support the shape of the cavity and maintain the flow area during the ultrasonic welding of a finstock layer over the cavity. As an exemplary material, the sacrificial material may be a metal powder.

After the finstock layer is applied over the cavity and ultrasonically welded to the existing metal component of the manifold structure to enclose the cavity, the sacrificial material is removed from the enclosed cavity. The resulting flow cavity is a clean enclosed cavity having smooth surfaces with an optimal flow area through the cavity. Each flow cavity is enclosed by a flat finstock layer extending between the walls of the cavity. The flat finstock layer is sufficiently supported by the walls and does not bow into the cavity. Using the sacrificial material to support the metal finstock layer during the UAM process is advantageous in that the sacrificial material is removed from the finished metal part, as opposed to using support posts machined within the cavity that may decrease the flow area.

According to an aspect of the invention, a method of forming a structure having at least one flow passage includes using an additive manufacturing process to build up a solid component by applying metal tapes in a layer-by-layer process, forming a cavity in the solid component, filling the cavity with a sacrificial material, ultrasonically welding a metal tape layer over the cavity when the cavity is filled with the sacrificial material to enclose the cavity with the metal tape layer, and removing the sacrificial material from the cavity when the metal tape layer is welded over the cavity.

According to an aspect of the invention, filling the cavity with the sacrificial material may include filling the cavity with a powdered metal material.

According to an aspect of the invention, ultrasonically welding the second layer over the cavity may include arranging the metal tape layer against the solid component, wherein the metal tape layer has ends contacting the solid component and a middle portion extending between the ends that covers the cavity.

According to an aspect of the invention, removing the sacrificial material from the cavity may include separating particles of the sacrificial material.

According to an aspect of the invention, separating the particles may include applying a vibration over a portion of the metal tape layer that encloses the cavity when the metal tape layer is welded to the solid component.

According to an aspect of the invention, removing the sacrificial material from the cavity may include providing a flow of air to the cavity to blow the sacrificial material out of the cavity.

According to an aspect of the invention, the method may include using a powdered metal that is formed of the same material as the solid structure.

According to an aspect of the invention, forming the cavity may include machining the solid component to form the cavity having a base and walls that extend perpendicularly from the base.

According to an aspect of the invention, filling the cavity with the sacrificial material may include arranging the sacrificial material to be flush with heights of the walls.

According to an aspect of the invention, removing the sacrificial material from the cavity may include scraping particles of the sacrificial material from the base and the walls of the cavity.

According to an aspect of the invention, machining the solid structure to form a cavity may include using a computer numerical control milling process.

According to an aspect of the invention, the method may include forming a plurality of cavities and a plurality of metal layers that are arranged parallel to one another for separating the cavities.

According to an aspect of the invention, forming the plurality of cavities may include forming the plurality of cavities to have equal shapes and sizes and forming the plurality of metal layers to have equal shapes and sizes.

According to an aspect of the invention, forming the plurality of metal layers may include forming flat metal layers and arranging the flat metal layers in a stacked configuration.

According to an aspect of the invention a structure having at least one enclosed cavity includes a base surface, a plurality of walls extending perpendicular to the base, and a plurality of flat metal tape layers extending between the walls, the flat metal tape layers being stacked in a direction normal to the base surface to segment the enclosed cavity into a plurality of enclosed cavities, the flat metal tape layers being parallel to one another and perpendicular to the walls, wherein the walls support the flat metal tape layers.

According to an aspect of the invention, the structure may be a manifold structure that is affixed to a heated surface and the flat metal tape layers may be finstock layers that are stacked in a direction normal to the heated surface.

According to an aspect of the invention, the base surface, the plurality of walls, and the flat metal tape layers may be formed of the same material.

According to an aspect of the invention, the base surface, the plurality of walls, and the flat metal tape layers may be formed of an aluminum alloy.

According to an aspect of the invention, a manifold structure having at least one flow passage includes a base surface, a plurality of walls extending perpendicular to the base and perpendicular to a direction of flow through the flow passage, and a plurality of flat finstock layers extending between the walls, the flat finstock layers being stacked in a direction normal to the base surface to segment the flow passage into a plurality of flow cavities, the flat finstock layers being parallel to one another and perpendicular to the walls, wherein the walls support the flat finstock layers.

According to an aspect of the invention, the manifold structure may be affixed to a heated surface and the finstock layers are stacked in a direction normal to the heated surface.

According to an aspect of the invention, the manifold structure may be a cross-flow heat exchanger having a longitudinal flow passage and a transverse flow passage.

According to an aspect of the invention, the cross-flow heat exchanger may be a plate fin heat exchanger.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have particular application in the ultrasonic additive manufacturing (UAM) process of metal parts, but other parts may also be suitable. UAM is advantageous in forming metal structures due to the capabilities of UAM in producing complex internal features within metallic materials. Examples of complex internal features that may be formed by UAM include honeycomb structures, internal pipes or channels, and enclosed cavities. The principles described herein may be used to form any structure that is suitable for the UAM process and includes an enclosed cavity. A manifold structure is just one example of a structure having a plurality of enclosed cavities that serve as fluid passages through the manifold. A cooling manifold structure formed by UAM may be formed by the principles described herein and implemented in various applications. For example, the cooling manifold structure may be used in aerospace applications such as radar structures that have electronics to be cooled.

A cooling manifold structure according to the present application may be affixed or attached to a surface to be cooled. The manifold structure may be finned for more efficient heat transfer through the manifold structure, by way of convection across the finstock. The finstock may be sheet-like in shape. Using UAM to build up layers of finstock in a cavity or flow passage of the manifold structure allows the layers or sheets of finstock to be oriented horizontally and stacked in a direction normal to the direction of heat flow. The finstock is also oriented in a direction normal to the heated surface. The arrangement of the finstock provides more efficient heat transfer through the manifold structure as compared with conventional manifold structures that have vertically-arranged finstock.

A plurality of cavities may be formed between the finstock layers to provide additional fluid passages through the manifold structure. To maintain a cavity during the ultrasonic welding of a finstock layer over the cavity, a sacrificial material, such as a powdered metal, is packed into the cavity as a sacrificial material. When the finstock layer or the metal strip has been ultrasonically welded over the cavity, the powder is removed. Removing the powder may include using a slight vibration to break up the packed powder, blowing air into the cavity, and/or scraping off any excess metal powder from walls of the cavity. Using the sacrificial m to maintain the structure of the cavity is advantageous in that the resulting manifold structure has parallel layers of finstock and cavities with smooth surfaces that are configured to maximize air flow through the structure.

Figure 1:
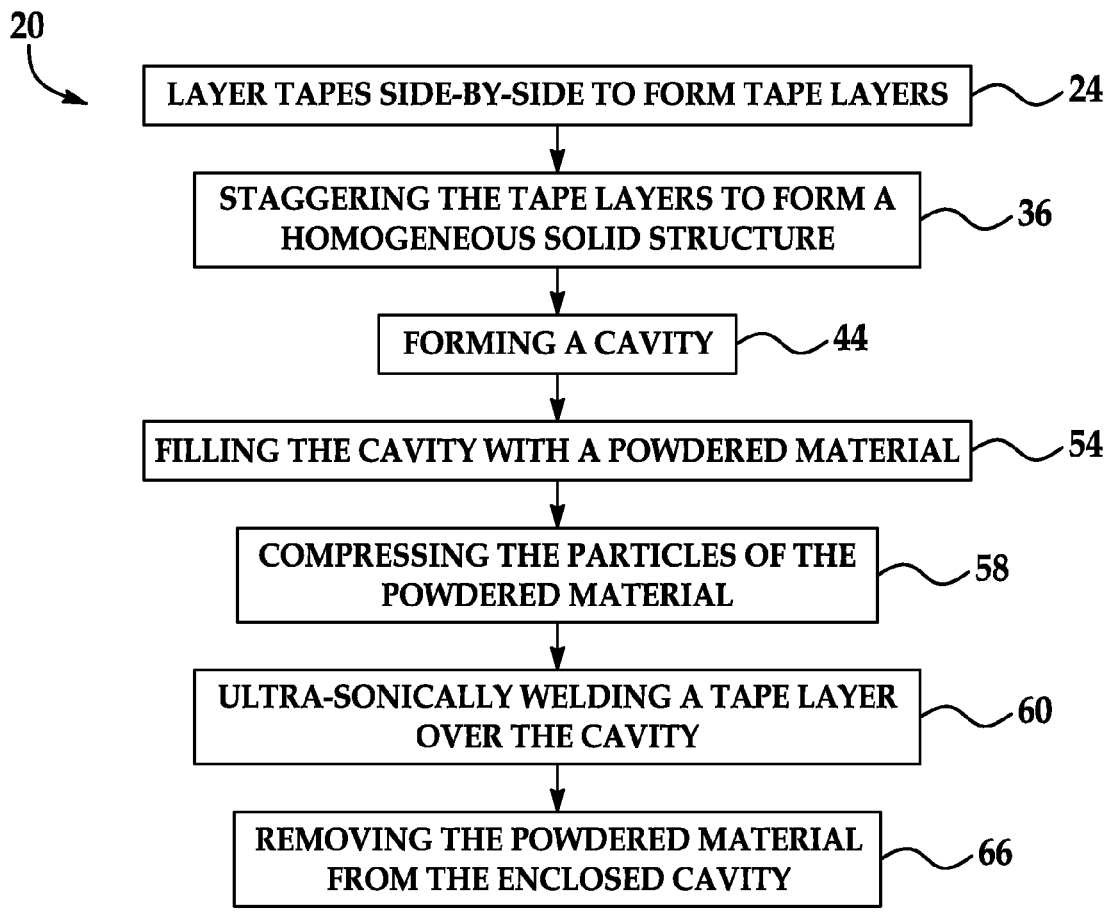
FIG. 1 is a flow chart illustrating a method of forming a manifold structure.
Figure 2:
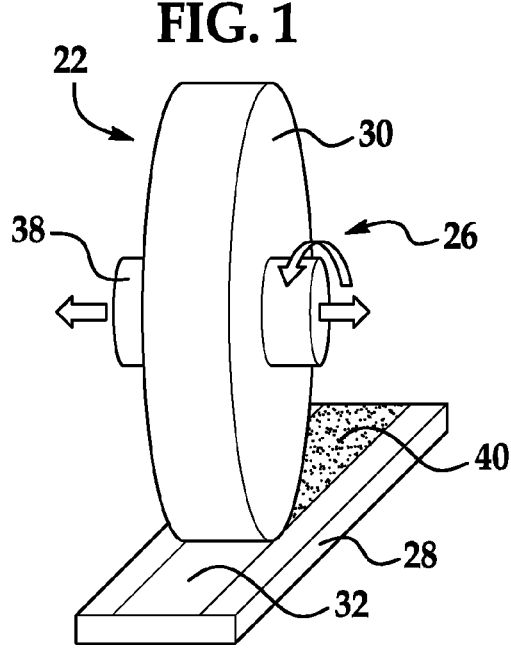
FIG. 2 is a schematic drawing showing an oblique view of a system for performing an ultrasonic additive manufacturing (UAM) process.
Figure 3:
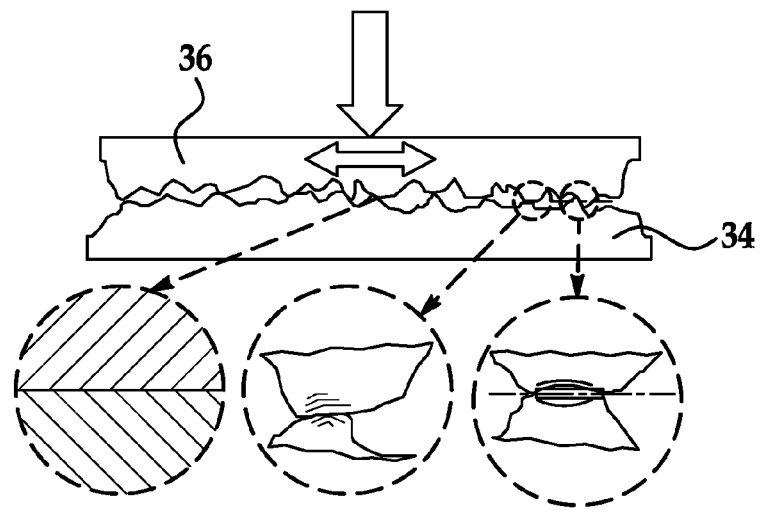
FIG. 3 is a schematic drawing showing an oblique view of metal tape layers that are merged together during the UAM process.
Figure 4:
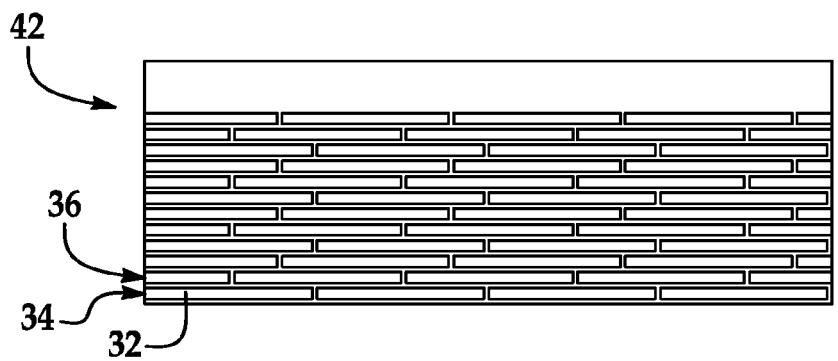
FIG. 4 is a schematic drawing showing a build-up of metal tape layers during the UAM process.
Figure 5:
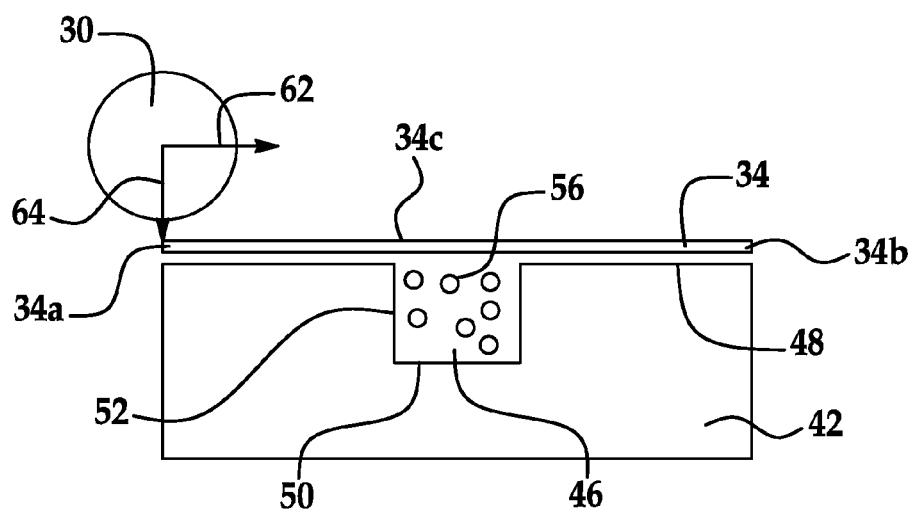
FIG. 5 is a schematic drawing showing a cavity with a sacrificial material placed in the cavity during the UAM process.
Figure 6:
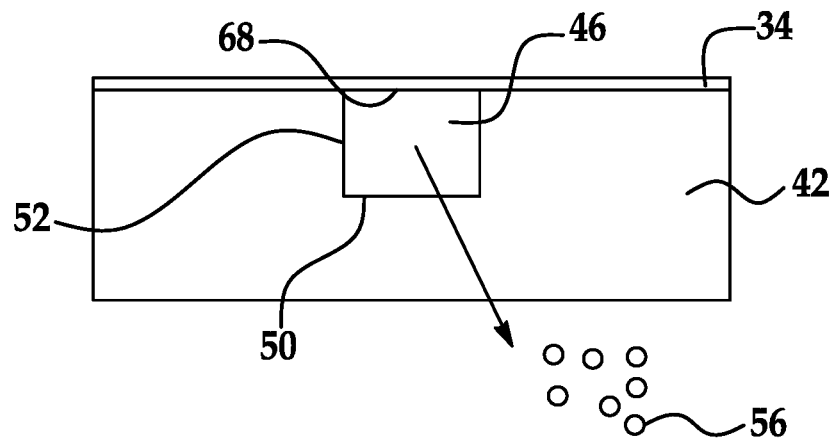
FIG. 6 is a schematic drawing showing the cavity with the sacrificial material removed from the cavity after a metal layer has been welded over the cavity.

Referring now to FIGS. 1-6, a method 20 and system 22 for forming a structure having at least one enclosed cavity is schematically illustrated. FIG. 1 is a flow chart illustrating a method 20 of forming the structure, which may be a manifold structure having a plurality of enclosed cavities that serve as flow passages. FIGS. 2-4 are schematic drawings illustrating the system 22 used to form the structure. FIG. 5 is a schematic drawing showing a cavity portion of the structure formed by the method 20 and FIG. 6 is a schematic drawing showing the cavity after it has been enclosed in accordance with the method 20.

The method 20 includes using UAM to build a metal part or structure of the structure. Step 24 of the method 20 includes laying metal tapes side-by-side to form a metal tape layer. FIG. 2 is a schematic drawing of the system 22 having a UAM machine 26 used for welding the tapes. The UAM process may be used to build up the part in a layer-by-layer process on a base plate 28 that is an existing part or a portion of an existing structure. The base plate 28 may be a heated substrate having a temperature in a range from near ambient room temperature up to 200 degrees Celsius. The UAM machine 26 includes a rotatable sonotrode 30 that rolls or travels along a length of the metal tape 32. The metal tape 32 may be in the form of a thin metal foil having a width between 100 and 150 microns and a thickness between 1.25 centimeters (0.5 inches) and 3.80 centimeters (1.5 inches). The dimensions of the metal tape 32 may be any suitable dimensions for a particular application. The sonotrode 30 is used to apply a force normal to the metal tape 32 to hold the metal tape 32 to the base plate 28 or another metal tape. Step 24 is repeated to form a metal tape or metal layer 34.

After the metal tapes 32 are laid to form the metal layer 34, step 36 of the method 20 includes staggering the metal layers 34 to form a homogenous structure that does not contain gaps between the metal tapes. Referring in addition to FIG. 3, a schematic drawing of the merging or welding of metal layers 34, 36 is shown. The sonotrode 30 may include transducers 38 that produce vibrations to oscillate the sonotrode 30 transversely to the direction of rotation of the sonotrode 30. The sonotrode 30 may oscillate at a constant frequency, such as around 20 kilohertz or another suitable frequency, to break oxide layers on the metal tapes of the metal layers 34, 36 to be adjoined to form a bonded or welded tape 40. FIG. 4 shows the metal tapes 32 laid side-by-side to form the layers 34, 36. The layers 34, 36 are stacked such that the metal tapes 32 of each layer are staggered. Each layer is welded or merged to a previously formed layer, such that a homogeneous part 42 is formed by building up the metal tape layers.

After the solid structure or homogeneous part 42 is formed, step 44 of the method 20 includes forming an internal geometrical feature of the part 42, such as a cavity or flow passage through the part 42. The cavity may be formed using the UAM process, such that the metal tape layers 34, 36 are built up to form a base surface and walls that define the cavity. The cavity may be formed without further machining or an alternative manufacturing process. Forming the cavity may include machining the solid structure to form the cavity. FIG. 5 is a schematic drawing of the part 42 showing the cavity 46 and the metal layer 34 to be welded over the cavity 46. The cavity 46 may be formed by computer numerical control (CNC) machining or milling. CNC machining may be used to mill or trim an upward-facing surface or top surface 48 of the part 42 to form the cavity 46. The CNC machining may include using a conical tool or a ball nose cutter to vertically mill into the part 42.

The cavity 46 may be formed to have a predetermined shape. The cavity 46 may have a rectangular cross-section with a base surface 50 and walls 52 that extend perpendicularly from the base surface 50. The walls 52 are separated by a gap, or the cavity 46. The walls 52 may be formed to have the same height such that the welded metal layer 34 extends over the cavity 46 in a horizontal orientation. The metal layer 34 that is to be ultrasonically welded to the part 42 extends parallel to the base surface 50 and perpendicular to the walls 52. The metal layer 34 may have ends 34a, 34b that contact the part 42, and a middle portion 34c that extends between the ends 34a, 34b and covers the cavity 46. The metal layer 34 may extend the entire width of the part 42. The cavity 46 may be formed such that the width of the base surface 50 is less than 0.635 centimeters (0.25 inches) and the height of the walls 52 may be equal or nearly equal to the width of the base surface 50. The length of the base surface 50 may extend the entire length of the part 42 to provide a passage through the part 42.

After the cavity 46 or flow passage is formed, step 54 of the method 20 includes filling the cavity 46 with a sacrificial material, such as a metal powder 56, to support the cavity 46 during the UAM process. The sacrificial material 56 may be poured or placed into the cavity 46 and the cavity 46 may be filled to a predetermined height, such as the height of the walls 52. The cavity 46 may be filled with the sacrificial material 56 such that the sacrificial material 56 is flush with the height of the walls 52. The sacrificial material 56 may include particles of powder having sizes of around 1 millimeter, but the powder sizes may vary. The particles may be formed of the same metal material as the part 42 and the particles may be pure metal particles or metal alloy particles. Using a metal powder is advantageous over using a eutectic metal or polymer in that it is not necessary to heat the part 42 to remove the sacrificial metal powder material. Using the same material as the part 42, in powder form, is advantageous in that the metal powder may be pulled into the welded portion, the metal layer 34, during the UAM process. Using a dissimilar material may weaken the layer 34 when a dissimilar material is pulled into the welded portion. Metal powder is provided as an exemplary sacrificial material, but the sacrificial material may be formed of any material that is suitable for supporting the metal layer during the UAM process. An example of a suitable material may include an oxide powder. The sacrificial material may be any suitable non-metal material. Examples of a suitable non-metal material include polymer beads, sand of varying grain size, sugars, salts, and organic powers or sands. The sacrificial material may be a non-powdered material, such as a viscous liquid. The viscous liquid may have a high viscosity to prevent the liquid from spilling out of the cavity 46 during the UAM process. Another sacrificial material may also be a eutectic material. The eutectic material is at a solid state at room and manufacturing temperatures, but is easily melted or liquefied at a relatively low temperature for easy insertion and removal.

After the sacrificial material 56 has been placed into the cavity 46, the particles may be loosely arranged within the cavity 46. Step 58 of the method 20 includes compressing or packing the particles of the powdered material, the metal powder 54, into the cavity 46 to decrease the porosity of the metal powder 54 within the cavity 46. A machine such as a metal powder compression tool or a press may be used to apply pressure to the loosely arranged powder to reduce the powder volume in the cavity 46, such that more powder may be added to the cavity to decrease the porosity. The press may include a head portion that has a size and/or shape complementary to the desired shape of the cavity 46. After the cavity 46 is filled with the powder, surface portions of the part 42 may be cleaned to remove excess powder before the powder is pressed into the cavity 46. The part 42 may then be placed into the press.

The powder may be repeatedly compressed and additional powder may be repeatedly added to the cavity until the height of the powder is level with the height of the cavity walls 52. The porosity of the cavity 46 may be greater than 90% but less than 100%, such that the powder is not overly compacted and prevented from removal from the cavity 46 after the UAM process. The machine may apply pressures between 150 megapascals and 700 megapascals. For example, a pressure of around 700 megapascals may be applied to reduce the volume of the powder by a factor between 2 and 2.5, and effectively decreasing the porosity by the same amount. Other pressures may also be suitable for compressing the particles into the cavity 46. The porosity of the final compacted powder may be inversely proportional to the amount of pressure applied. Steps 54 and 58 of the method 20 may be repeated until the cavity 46 is densely filled such that the metal powder 56 is flush with the height of the walls 52. Steps 54 and 58 may be repeated until a density of the powder within the cavity 46 reaches a predetermined value that may support the high forces applied over the metal powder 56 within the cavity 46 during the UAM process. The high forces applied during the UAM process may be around 2 megapascals (250 pounds per square inch).

After the cavity 46 is filled with the sacrificial material 56 to achieve the desired density for sufficiently supporting the cavity 46, step 60 of the method 20 includes ultrasonically welding a metal tape layer, or metal layer 34, over the cavity 46 that is filled with the sacrificial material 56. As schematically shown in FIG. 5, the welding horn of the sonotrode 30 rolls along the metal layer 34 in a direction 62 that is parallel to the metal layer 34 and the base surface 50 of the cavity 46. During operation of the sonotrode 30, the sonotrode 30 and the transducer 38 vibrate at high-frequencies of around 20,000 Hertz (or another suitable value) to weld the metal layer 34 to the part 42 or another metal layer of the part 42. Due to vibrations of the sonotrode 30, a force of around 2 megapascals may be exerted in a direction 64 that is normal to the metal layer 34. As the sonotrode 30 rolls over the middle portion 34c of the metal layer 34 that encloses the top portion of the cavity 46 between the walls 52, the metal powder 56 supports the portion 66 of the metal layer 34 subject to the normal force of the sonotrode 30, such that the metal layer 34 maintains a flat shape over the cavity 46. Step 60 may include bridging the walls 52 by applying the metal layer 34 over the cavity 46. Thus, the shape and size of the cavity 46 is maintained and the metal layer 34 is welded over the cavity 46 such that the metal layer 34 is parallel with the base surface 50 of the cavity 46. The cavity 46 of the finished part is enclosed and defined by the base surface 50, the walls 52, and the middle portion 34c of the welded metal layer 34.

As schematically shown in FIG. 6, after the metal layer 34 has been ultrasonically welded over the cavity 46 to enclose the cavity 46 and form the enclosed cavity, step 66 of the method 20 includes removing the powdered material, the metal powder 56, from the enclosed cavity 46. Removing the powdered material from the enclosed cavity 46. The cavity 46 is formed within the part 42 and may include four walls 52 for supporting the cavity 46 during the UAM process. In an exemplary embodiment of the cavity 46, after the UAM process, at least one of the four walls 52 may be machined to form an opening such that the metal powder 56 may be removed from the cavity 46 through the opening. Two opposite facing walls of the four walls 52 may be machined to create a flow passage through the part 42, such that the metal powder 56 may be removed from the cavity 46 through either end of the flow passage. In another exemplary embodiment, one of the walls 52 may be formed to include at least one passage in communication with the cavity 46. During the UAM process, the passage may be closed via a plug, stopper, or any other suitable closing mechanism. After the UAM process, the closing mechanism may be removed from the passage such that the powdered metal may be removed from the cavity 46 through the passage. In still another exemplary embodiment, the cavity 46 may be formed to have two walls and an elongated length extending between open ends of the cavity 46. A portion of the length may be enclosed by the metal layer 34. Due to the length of the cavity 46, the powder material may be held within a portion of the cavity 46 and may be removed from one of the open ends of the cavity 46.

The powdered metal may be removed using any suitable method. For example, a slight vibration, such as a vibration having a frequency less than 100 Hertz (or another suitable value), may be applied over the welded metal layer 34 such that the packed metal particles of the metal powder 56 break up and disperse from one another. When the metal particles of the metal powder 56 are unpacked and loosely arranged, the metal particles of the metal powder 56 may exit the cavity 46 through at least one passage from the cavity 46 through the metal part 42. The part 42 may be shaken such that the loosely arranged particles fall out of the cavity 46. A stream of air may also be blown into the cavity 46 to remove the metal powder, that may be in either the compacted state or in the loosely arrange state. Step 66 may also include removing any excess powder remaining in the cavity after an initial powder removing process. After an initial powder removing process such as applying vibrations, blowing, and or shaking the powder material out of the part 42, powder may be retained on the walls 52, on the base surface 50, or on the middle portion 34c of the metal layer 34. Removing the excess powder may include scraping the powder off the respective surface and blowing or shaking the scraped powder out of the cavity 46.

After the sacrificial metal powder 56 has been removed from the cavity 46, the resulting build is a clean cavity 46 enclosed by the base surface 50, the walls 52, and the welded metal layer 34 that extends over the cavity 46 to bridge the walls 52. The cavity 46 may have a rectangular cross section as in the illustrated embodiment, or alternatively may have other suitable shapes. The walls 52, the base surface 50, and the portion 68 of the welded metal layer 34 that faces the cavity 46 may have smooth surfaces or surfaces with minimal impurities such that the fluid flow area through the cavity 46 is optimal. The welded metal layer 34 is supported only by the walls 52 of the cavity 46 and extends parallel with the base surface 50. Using the sacrificial metal powder allows the metal layer 34 to avoid bowing into the cavity 46 during the UAM process such that the area of flow through the cavity 46 would be reduced.

Figure 7:
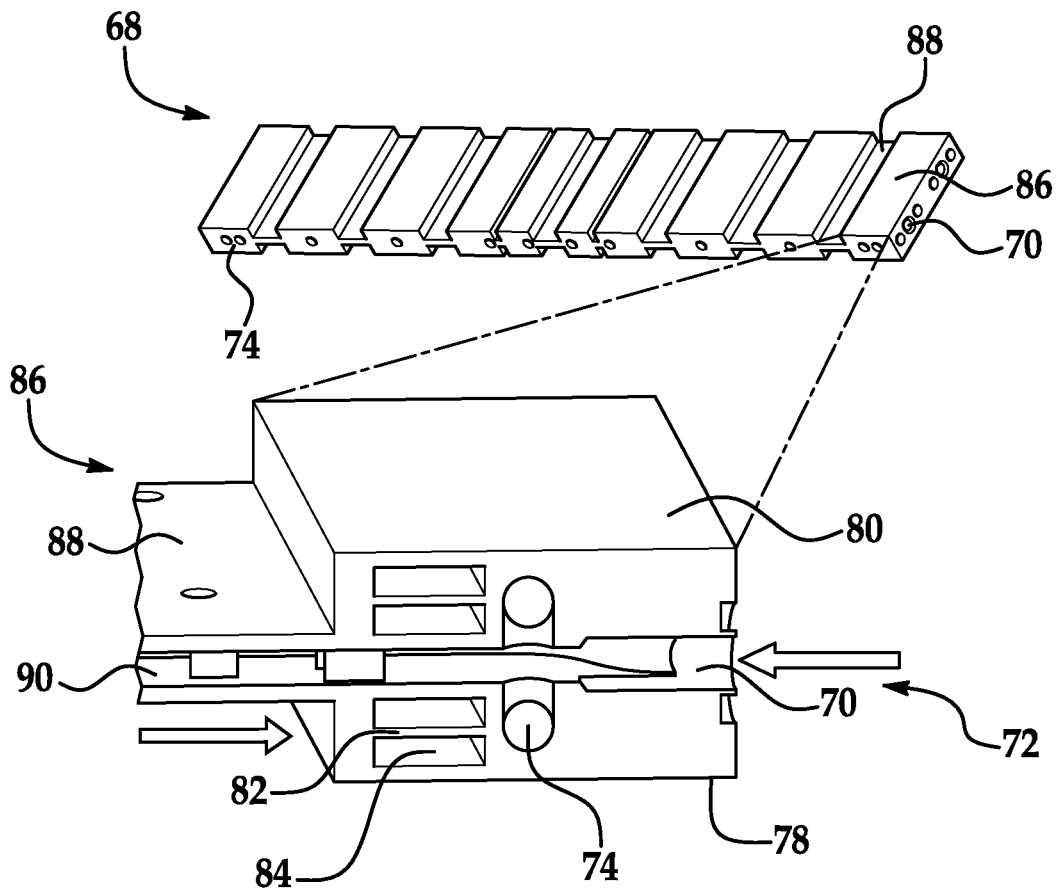
FIG. 7 is an oblique view of part of a manifold structure formed by the method illustrated by the flow chart of FIG. 1.

Referring in addition to FIG. 7, the method 20 described herein may be repeated to build up a manifold structure 68 having multiple cavities that serve as flow passages and metal finstock layers. The exemplary manifold structure 68 includes at least one cavity, or manifold 70 extending through the structure 68 in a first flow direction 72 and at least one manifold 74 extending through the structure 68 in a second direction perpendicular to the first flow direction 72. The manifold structure 68 may be built up using UAM and the finished structure 68 may include a plurality of corrugated die-formed fin sheets 78 interposed between flat metal separator plates 78, 80. The sheets of finstock 82 are metal layers that are arranged in a direction normal to the direction of heat flow through the manifold structure 68, providing for a short and direct path of heat travel. The layers of finstock 82 may be arranged in a direction normal to the heated surface (not shown). The flow passages of the manifolds of the manifold structure 68 may extend in a longitudinal direction and a transverse direction. As shown in FIG. 7, the layers of finstock 82 may extend through a flow passage. The layers of finstock 82 may define cavities 84 between each layer to enable flow through the respective flow passage. A flow passage may be segmented by the finstock 82 such that the cavities 84 form sub-flow passages through the flow passage.

The manifold structure 68 may be a cross-flow heat exchanger for cooling a heated surface, where manifold 70 is a longitudinal flow passage and manifold 74 is a transverse flow passage. The cross-flow heat exchanger may be a plate fin heat exchanger, such that separate hot and cold fluid streams may flow through alternating layers of the heat exchanger. The flow passages 70, 74 are arranged perpendicular to one another, such that a first fluid may pass through a flow passage and a second fluid may pass around the flow passage at a 90 degree angle. The finstock 82 is provided for structural integrity of the heat exchanger by providing an extended surface area for heat transfer through the heat exchanger. The finstock 82 is generally square-shaped and in an exemplary embodiment, the finstock 82 may have a thickness between 0.013 centimeters (0.005 inches) and 0.018 centimeters (0.007 inches).

The manifold structure 68 may include a finned area or unit cell 86 that contains the layers of finstock 82. Each unit cell 86 may be in fluid communication with a manifold of the structure 68 allowing heat flow through the respective unit cell. The unit cell 86 may be connected to another unit cell through thin transfer walls 88 that define a flow passage 90 therebetween. As shown in FIG. 7, the flow passage 90 may be in fluid communication with manifold 70. The finstock 82 may be arranged in a direction normal to the thin transfer walls 88. The manifold structure 68 may include two or more unit cells, and the geometry of the unit cell may be repeated throughout the structure 68 to form a complete manifold part. In an exemplary configuration, the manifold part may be around 50 centimeters (20 inches) long, although many other sizes are possible.

Forming the layer of finstock 82 by the UAM process is advantageous in that the finstock 82 may be configured to increase heat transfer from the heated surface to which the manifold structure 60 is attached, via the surface area of the finstock 82. The finstock 82 enables heat flow through the manifold structure 20 by way of convection. The finstock 82 accommodates for reduction in temperature potential between the finstock 82 and the ambient fluid due to conduction along the finstock 82 and convection from or to the surface of the finstock 82. The fin efficiency is dependent on fin geometry, fin material thermal conductivity, and a heat transfer coefficient at the fin surface. Arranging the finstock 82 normal to the surface to be cooled effectively changes the geometry of the fin, by providing a more direct heat transfer path through the heat exchanger. Using UAM fabrication to form the finstock 82 is also economical in that the finstock does not need to be separately purchased and subsequently placed in the metal part, or brazed into the metal part.

Using the method 20 of forming the manifold described herein, the finstock layers are formed by the UAM process and the sacrificial metal powder supports the cavities 84 between the layers of finstock 82 during the UAM process. Using the sacrificial metal powder enables the flow passage or cavity 84 to maintain the size and shape of the flow area through the cavity 84. As shown in FIG. 7, the manifold structure 68 may include multiple cavities 84 that are vertically stacked. Using the sacrificial metal powder to maintain the cavities during the UAM process enables the ultrasonically welded layers of finstock 82 to extend parallel to one another and normal to the direction of flow without bowing into the respective cavity 84 located beneath the layer. The layers of finstock 82 are arranged to optimize heat transfer through the manifold structure 68, such as in a direction normal to the heated surface. Increasing efficiency of the cooling function performed by the manifold structure allows for improved thermal performance of manifold structures used for cooling high power electronics. Using the sacrificial metal powder is also advantageous in that the cavities defined between the layers of finstock 82 may maintain bulk material properties and hermeticity of the walls of the cavity such that coolant passing through the cavities does not leak.

Forming the manifold structure 68 by UAM enables material properties of the base material of the metal part to be maintained. UAM also enables forming the manifold structure by welding of dissimilar metals and multi-material laminates, such that multiple metal foils may be combined. Examples of suitable metal materials for the UAM process include aluminum, beryllium, copper, gold, iron, molybdenum, nickel, palladium, platinum, tantalum, titanium, tungsten, and zirconium. Alloys of aluminum, copper, gold, iron, nickel, such as inconel, and platinum may also be suitable. Stainless steel may be a suitable material. The material may include a ceramic-fiber reinforced metal matrix material. It should be recognized that the maximum width of the cavity to be supported in the part may be dependent on the material of the part. For example, the maximum width of an unsupported cavity in an H18 aluminum part may be between 0.508 centimeters (0.200 inches) and 0.6096 centimeters (0.240 inches) due to lower tensile strengths and hardness properties as compared with other aluminum alloys. For increasing the maximum width of the unsupported cavity to widths near 0.635 centimeters (0.250 inches), aluminum alloys or other materials having tensile strengths between 130 and 390 megapascals or a Brinell hardness number greater than 35 may be suitable. In an exemplary embodiment, an aluminum alloy such as 6061-T6 may be used.

Applications requiring cooling manifolds may implement fewer manifolds, given the increased efficiency of the manifold structure according to the present application. Providing fewer manifold structures decreases power used to pump coolant through the manifolds, effectively reducing the overall operating costs of the electronics and associated cooling manifold structure. In aerospace applications such as radars, the manifold structure according to the present application may be implemented to allow radars to operate at a higher energy level due to the improved detection of the radar by increased efficiency of cooling the circuitry.

Manifolds are just one example of a structure that may be formed according to the method described herein. Using the sacrificial material to maintain an internal geometry, such as a cavity, during the UAM process may also be beneficial in forming other parts. The sacrificial powder may be used to form a cavity, such as a channel, in any suitable structure for reducing the overall weight of the structure. Metal parts are described herein, but a method of forming any suitable part by the UAM process may implement sacrificial material to maintain internal geometries during the UAM process. After being formed by the UAM process, the built up structure may be formed of a material other than metal. Examples of other applications that may be suited to use the method described herein include medical devices, automotive components, aerospace devices, and building support structures.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of forming a structure having an enclosed cavity, the method comprising:
    using an additive manufacturing process to build up a solid component by applying metal tapes in a layer-by-layer process;
    forming a cavity in the solid component;
    filling the cavity with a sacrificial material;
    ultrasonically welding a metal tape layer over the cavity when the cavity is filled with the sacrificial material to enclose the cavity and form the enclosed cavity; and
    removing the sacrificial material from the enclosed cavity by separating particles of the sacrificial material,
    wherein separating the particles includes applying a vibration over a portion of the metal tape layer that encloses the cavity when the metal tape layer is welded to the solid component.

2. The method of claim 1, wherein ultrasonically welding the metal tape layer over the cavity includes arranging the metal tape layer against the solid component, wherein the metal tape layer has ends contacting the solid component and a middle portion extending between the ends that covers the cavity.

3. The method of claim 1, wherein removing the sacrificial material from the enclosed cavity includes providing a flow of air to the enclosed cavity to blow the sacrificial material out of the enclosed cavity.

4. The method of claim 1, further including using a powdered metal that is formed of the same material as the solid component.

5. The method of claim 1, wherein forming the cavity includes machining the solid component to form the cavity having a base and walls that extend perpendicularly from the base.

6. The method of claim 5, wherein filling the cavity with the sacrificial material includes arranging the sacrificial material to be flush with heights of the walls.

7. The method of claim 5, wherein removing the sacrificial material from the enclosed cavity includes scraping particles of the sacrificial material from the base and the walls of the cavity.

8. The method of claim 5, wherein machining the solid component to form the cavity includes using a computer numerical control milling process.

9. The method of claim 1, further including forming a plurality of enclosed cavities and a plurality of metal layers that are arranged parallel to one another for separating the enclosed cavities.

10. The method of claim 9, wherein forming the plurality of enclosed cavities includes forming the plurality of enclosed cavities to have equal shapes and sizes and forming the plurality of metal layers to have equal shapes and sizes.

11. The method of claim 9, wherein forming the plurality of metal layers includes forming flat metal layers and arranging the flat metal layers in a stacked configuration.

12. A method of forming a structure having an enclosed cavity, the method comprising:
    using an ultrasonic additive manufacturing process to build up a solid component by applying metal tapes in a layer-by-layer process;
    forming a cavity in the solid component;
    filling the cavity with a sacrificial material;
    ultrasonically welding a metal tape layer over the cavity when the cavity is filled with the sacrificial material to enclose the cavity and form the enclosed cavity; and
    removing the sacrificial material from the enclosed cavity,
    wherein filling the cavity with the sacrificial material includes filling the cavity with a fluid that supports the cavity when the metal tape layer is ultrasonically welded over the cavity, wherein the fluid has a viscosity to prevent the fluid from spilling out of the cavity during the ultrasonic additive manufacturing process.

13. The method of claim 1, wherein filling the cavity with the sacrificial material includes filling the cavity with a powdered metal material.

* * * * *